Figure 1:
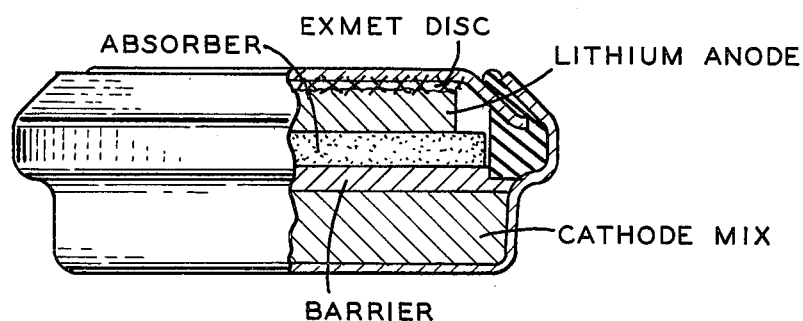

United States Patent [19]

Dey

[11] 4,423,124
[45] Dec. 27, 1983

[54] LITHIUM-METAL CHROMATE ORGANIC ELECTROLYTE CELL AND METHOD FOR CATHODE

[75] Inventor: Arabinda N. Dey, Needham, Mass.

[73] Assignee: Duracell Inc., Bethel, Conn.

[21] Appl. No.: 754,775

[22] Filed: Dec. 27, 1976

Related U.S. Application Data

[63] Continuation of Ser. No. 545,637, Jan. 30, 1975, abandoned.

[51] Int. Cl.³ .............................................. H01M 6/14
[52] U.S. Cl. .................................... 429/194; 429/219; 29/623.5; 264/104
[58] Field of Search ............... 429/218, 219, 220, 225, 429/217, 232, 194, 198, 196, 199; 29/623.5; 252/425.3; 427/126; 264/104, 105; 423/595, 596

[56] References Cited

U.S. PATENT DOCUMENTS

| | | | |
|---|---|---|---|
| 3,658,592 | 4/1972 | Dey | 429/197 |
| 3,853,627 | 12/1974 | Lehmann et al. | 429/144 |
| 3,871,915 | 3/1975 | Brych | 429/218 X |
| 3,877,986 | 4/1975 | Catherino | 429/217 |
| 3,925,101 | 12/1975 | Lehmann et al. | 429/194 |

*Primary Examiner*—Charles F. Lefevour
*Attorney, Agent, or Firm*—Ronald S. Cornell; Israel Nissenbaum

[57] ABSTRACT

A method for preparing metal chromate cathode electrodes for use in non-aqueous lithium/chromate cells for medium to high discharge rate service is described. Cells utilizing such cathodes are also described. Chromates used include the chromates, dichromates and basic chromates of silver, copper, mercury and lead. The cathodes can be prepared without internal conductive elements or cohesive binders.

9 Claims, 8 Drawing Figures

DISCHARGE OF LU-625 BUTTON CELLS IN VARIOUS ELECTROLYTES - 215 MAH, 4 MA DISCHARGE

CELL 1 - 1 M $LiAsF_6$ IN 1:1 PC/THF
CELL 2 - 1 M $LiPF_6$ IN 1:1 PC/THF
CELL 3 - 1 M $LiBF_4$ IN 1:1 PC/THF

DISCHARGE CHARACTERISTICS OF Li-CuCrO₄ CELL

DISCHARGE CHARACTERISTICS OF Li-HgCr₂O₇ CELL

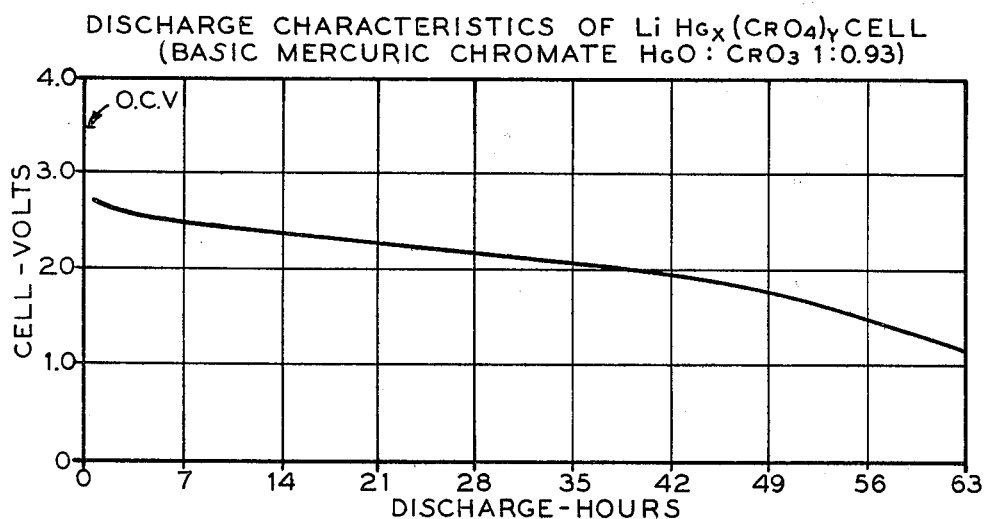
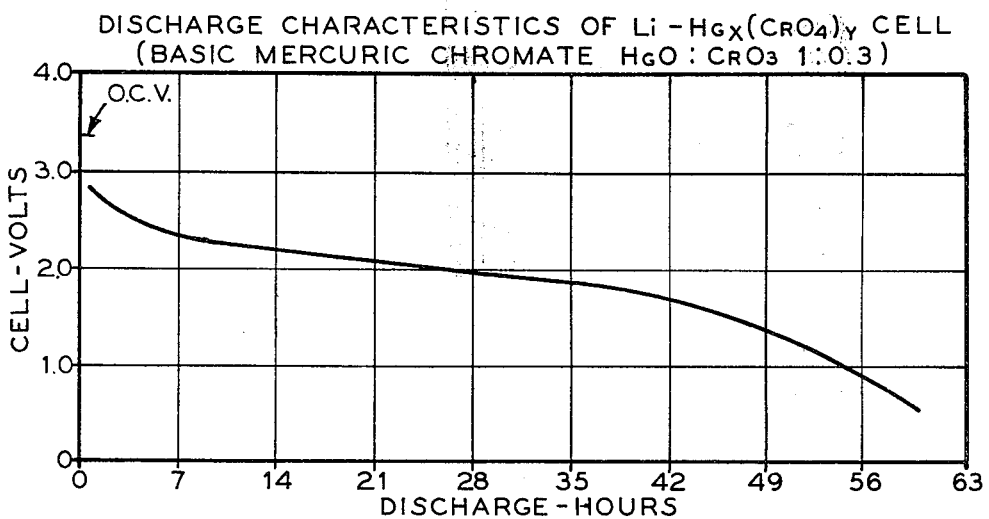

LITHIUM-METAL CHROMATE ORGANIC ELECTROLYTE CELL AND METHOD FOR CATHODE

This is a continuation of application Ser. No. 545,637, filed Jan. 30, 1975, now abandoned.

FIELD OF THE INVENTION

This invention relates to high energy density organic electrolyte cells and more particularly to improvements in the method for the manufacture of such cells based upon active metal anodes and metal chromate cathodes.

BACKGROUND OF THE INVENTION

In U.S. Pat. No. 3,658,592 there is described a high energy density cell comprising a positive electrode, composed of a metal chromate and graphite in weight ratios of 1 to 24 parts of metal chromate to 1 part of graphite, and a binder in an amount of 1 to 10 percent by weight of the electrode material, said metal chromate being selected from the group consisting of silver, copper, iron, cobalt, mercury, thallium, lead and bismuth chromates, and mixtures thereof; negative electrodes composed of light metals selected from the group consisting of Li, Na, K, Ca, Be, Mg, and Al; said electrodes being disposed in an electrolyte comprising an organic solvent selected from the group consisting of tetrahydrofuran, N-nitrosodimethylamine, dimethyl-sulfite, propylene carbonate, gamma-butyrolactone, dimethyl carbonate, dimethoxyethane, acetonitrile, dimethyl sulfoxide, dimethyl formamide, and mixtures thereof and having dissolved therein soluble salts of said light metals.

Such cells have an excellent open circuit voltage (OCV = 3.35 ± 0.05 V) and perform with reasonable efficiency at low discharge rates (ma/cm$^2$).

OBJECTS OF THE INVENTION

It is an object of this invention to provide a modified method of preparing a metal chromate cathode active material into cathodes which when utilized in the organic electrolyte cells according to the aforementioned patent will permit operation of such cells at medium rates at reasonably high efficiencies.

It is a further object of this invention to provide ancillary cell components which when utilized with such cathodes will provide commercially useful electrochemical cells.

These and other objects of this invention are realized by the practice of this invention as set forth below.

THE INVENTION

The present invention is based upon the discovery that by the use of a simplified cathode construction procedure, it is possible to eliminate both the graphite and the binder and obtain cells with good performance at high efficiencies and that the cells prepared with only the graphite added to the chromate and pressed at pressures in the range 1500–5000 psi and preferably at approximately 2000 psi, will yield cathodes which will perform in cells according to the aforementioned patent at medium to high discharge rates at efficiencies approaching and exceeding 70 percent.

The cathodes prepared from pure silver chromate and from silver chromate containing up to 10 percent by weight of graphite, when pressed at pressures of about 2000 psi yield cathodes of adequate mechanical integrity for use in commercial button cells. Similarly, cells using chromates, dichromates and basic chromates of metals from the group consisting of a silver, copper, mercury, and lead yielded adequate cathodes for use in cells according to the aforementioned patent. These cells were adequate with regard to mechanical integrity and for use at medium discharge rates.

While the use of a binder is not absolutely necessary, binders can be included in the cathode mix. However, it is not necessary to heat the bound electrodes pressed at the lower pressures or at the more elevated pressures. Curing step is no longer necessary, no matter whether the electrodes are pressed at low or high pressures.

Satisfactory cathodes can be prepared from such metal chromates as silver chromates ($Ag_2CrO_4$), mercury chromate ($HgCrO_4$), copper chromate ($CuCrO_4$), silver dichromate ($Ag_2Cr_2O_7$), mercury dichromate ($HgCr_2O_7$), copper dichromate ($CuCr_2O_7$) and basic mercuric chromates of the general formula $(HgO)_x(CrO_3)_y$ wherein the mole ratio of x/y varies from about 1:1 to 1:0.22.

The cathodes prepared at the low pressures described above can be fashioned into high efficiency, medium discharge rate, electrochemical cells which consist of these metal chromate cathode prepare as set forth above, an anode and separator means therebetween in a non-aqueous electrolyte system comprising an organic solvent selected from the group consisting of tetrahydrofuran, N-nitrosodimethylamine, dimethyl sulfoxide, dimethyl sulfite, propylene carbonate, gamma-butyrolactone, dimethyl carbonate, dimethoxyethane, acetonitrile and dimethyl formamide having dissolved therein, as electrolytes, at least one solvent-soluble ionic salt of an anode metal. The anode can be selected from the active light-metal anode metals of the group consisting of lithium, sodium, potassium, calcium, beryllium, magnesium, and aluminum. The solvent-soluble salt being selected from the group of soluble salts of said light anode metals. The cathodes are those above-described comprising powdered metal chromates containing up to 10 weight/percent of powdered graphite and compressed at pressures not exceeding 5000 psi but in the range from about 1500 psi–5000 psi. About 2000 psi is preferred.

In general, it has been found that for the cells of this invention, the organic electrolyte should include sufficient dissolved ionic salts so that the electrolyte has a specific conductivity of $10^{-5}$ ohms$^{-1}$ cm$^{-1}$ or higher. The conductive electrolyte solvent-soluble salts should consist of salts of said active metals with such anions as $ClO_4^-$, $AsF_6^-$, $PF_6^-$, $BF_4^-$, $SbF_6^-$, $AlCl_4^-$, $Cl^-$, $Br^-$, and $I^-$ anions.

The invention will be more particularly described with reference to the following examples and the appended figures relating to these specific examples.

SILVER CHROMATES

Example 1

Lithium silver chromate cells were constructed in the button cell cans, having the configuration of (FIG. 1) using pure powdered silver chromate pressed onto the cathode can (1) with a force of approximately 2000 lbs. The cathode made in the above manner retained its mechanical integrity. The lithium anode was constructed by prewelding a disc of expanded copper (3) on the anode can and subsequent pressing of a disc of lithium (2) on to the expanded metal. The separator (4)

consisted of a disc of filter paper (cellulosic material) placed between the anode top and the cathode can. The cell was crimped closed after addition of the electrolyte consisting of 1 molar LiClO$_4$ in a equivolume mixture of tetrahydrofuran and propylene carbonate.

Figure 2:
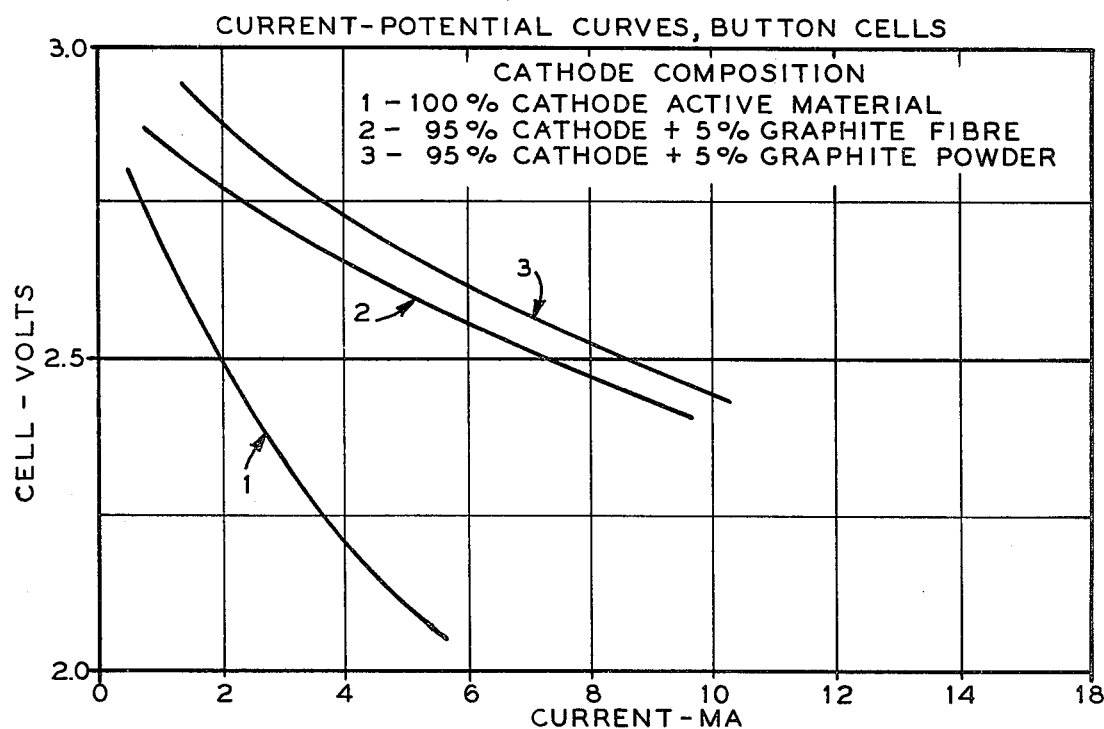
Figure 3:
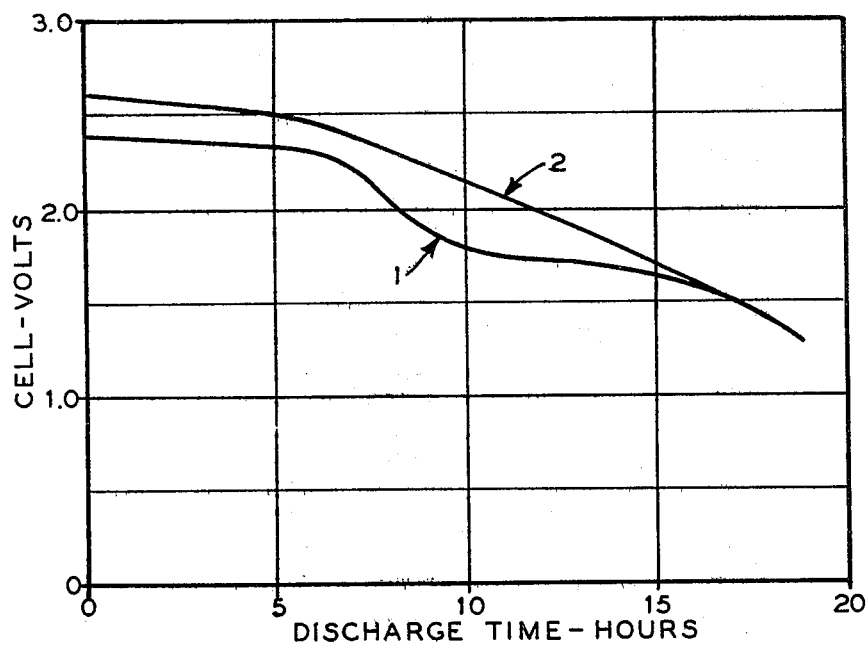

The open circuit voltage of the cell was 3.3 volt. The current-voltage characteristics of the cell is shown in FIG. 2 (curve 1). The cell was discharged at a constant current of 4 ma. The discharge curve is shown in FIG. 3 (curve 1). The lithium metal chromate cells can apparently operate successfully without any graphite or binder in the cathode, because the discharge of metal chromates such as Ag$_2$CrO$_4$ or HgCrO$_4$ results in the in situ formation of the electronically conductive metal according to the cell reaction:

$$4Li + Ag_2CrO_4 \rightleftharpoons 2Ag + 2Li_2O + CrO_2$$

The metal provides the electronic conductivity needed for further discharge of the metal chromate.

Example 2

Lithium/silver chromate cells were prepared as in Example 1 but the cathode fabrication procedure was modified to the extent that 5% of graphite was added to the chromate mix without any binder. Cells were constructed in button cell cans as in Example 1 above, except the cathodes were made by pressing mixtures of 20 parts of powder silver chromate and 1 part of graphite, at a force of 2000 lbs. The open circuit voltage of these cells were 3.3 volts. The current-voltage characteristics of the cells and the discharge curve at 4 ma current are shown in FIG. 2 (curves 2 and 3) and FIG. 3 (curve 2) respectively. The test data demonstrate that the lithium-metal chromate cells can be operated without any binder in the cathode.

Example 3

The metal chromate cathodes were also found to operate well when these were constructed with graphite and a colloidal Teflon binder, without any curing at temperatures above 25° C. Lithium-mercuric chromate 'D' cells were constructed using HgCrO$_4$ cathodes made from a paste of a slugged mixture of HgCrO$_4$:-graphite-colloidal Teflon in the ratio 17:2:1. The paste was prepared with isopropanol as a vehicle as described in U.S. Pat. No. 3,658,592. The cathodes (12"×1.75") were made by rolling the paste on an expanded tantalum grid by means of a dough rolling machine. The cathodes were then dried under vacuum at room temperature. 'D' size cells were constructed using these cathodes and a lithium anode. The cells were fitted with an aluminum top and a titanium cathode tab coated with a solution-deposited polyethylene coating to provide protection against corrosion. The electrolyte used was 1 M LiClO$_4$ in an equivolume mixture of tetrahydrofuran and propylene carbonate. The 'D' cells were discharged at currents of 0.25 amp, 0.5 amp and 0.75 amp. The recovered cell capacities and the cathode utilization efficiencies are shown in Table 1.

TABLE 1

| | Li/HgCrO$_4$ 'D' Cell Performance | | |
|---|---|---|---|
| No. | Discharge Current | Capacities A.Hr. to 1.5 volt cutoff | Cathode Utilization Efficiency |
| 1 | 0.25 Amp | 14 | 99% |
| 2 | 0.50 Amp | 5.6 | 40% |

TABLE 1-continued

| | Li/HgCrO$_4$ 'D' Cell Performance | | |
|---|---|---|---|
| No. | Discharge Current | Capacities A.Hr. to 1.5 volt cutoff | Cathode Utilization Efficiency |
| 3 | 0.75 Amp | 4.5 | 33% |

The good cell performance as shown above, demonstrates that the metal chromate cathodes can be operated without any curing step in the cathode fabrication.

Example 4

Cells were prepared utilizing the configuration of FIG. 1 and the cathode materials of Example 2. The cells were modified only to the extent that the following electrolytes were used in the cells.

(a) 1 M LiAsF$_6$ (lithium hexafluoroarsenate) in a equivolume mixture of tetrahydrofuran, and propylene carbonate, (b) 1 M LiPF$_6$ (lithium hexafluorophosphate) in an equivolume mixture of tetrahydrofuran and propylene carbonate, and (c) 1 M LiBF$_4$ (lithium tetrafluoroborate) in a equivolume mixture of tetrahydrofuran and propylene carbonate.

Figure 4:
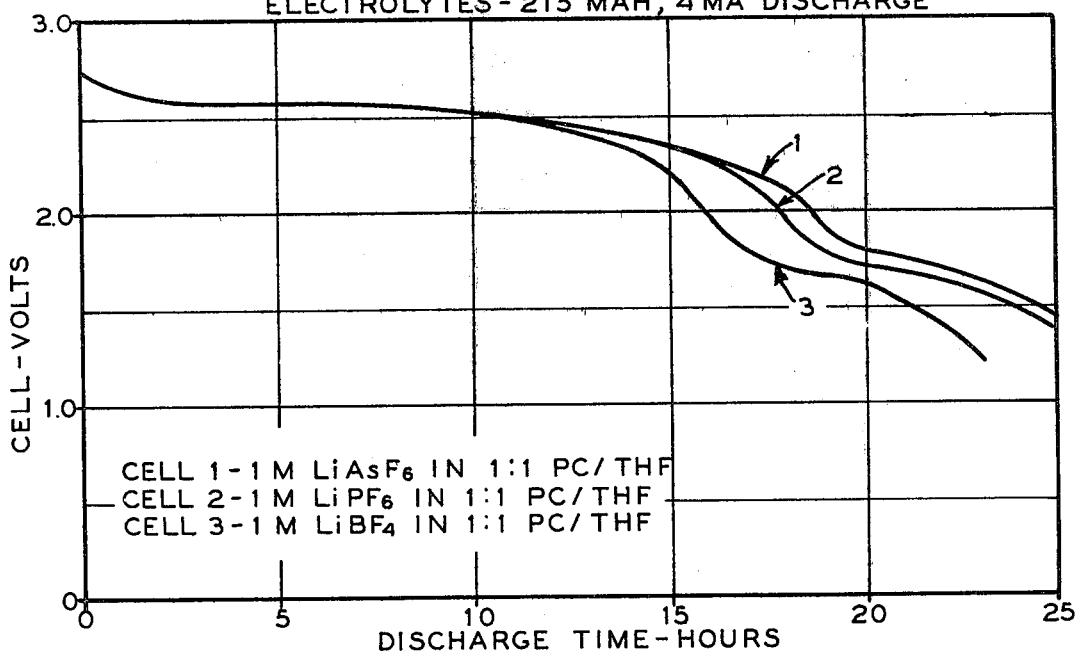

The cells were discharged at 4 ma current. The discharge curves are shown in FIG. 4. It is evident that the cells performed quite well. This demonstrates that the electrolyte salts such as LiAsF$_6$, LiPF$_6$, LiBF$_4$ in conjunction with the previously disclosed solvents can be used as electrolytes for the lithium-metal chromate organic electrolyte cells. Other salts with anions such as AsF$_6^-$, PF$_6^-$, ClO$_4^-$, BF$_4^-$, AlCl$_4^-$, Cl$^-$, Br$^-$, I$^-$ and cations such as Li$^+$, Na$^+$, K$^+$, Mg$^{++}$, Ca$^{++}$, Ba$^{++}$, quarternary ammonium ions which provide conducting solutions (of specific conductivity of 10$^{-5}$ ohm$^{-1}$cm$^{-1}$ or higher) in conjunction with the organic solvents and solvent mixtures are also useful as non-aqueous organic electrolytes for the lithium-metal chromate cells.

In U.S. Pat. No. 3,658,592 the use of metal chromates (MCrO$_4$) is described. The salts of the metal-chromium-oxygen combinations other than MCrO$_4$ can also be used to formulate cells. This includes higher valent metal cation and/or dichromate anion, and also basic chromates. The use of these salts provides certain improvements. These are illustrated in the following preparations and tests.

Example 5

Silver dichromate is prepared by the addition of a solution of alkali metal dichromate solution to a silver nitrate solution to precipitate Ag$_2$Cr$_2$O$_7$. The open circuit voltage of Li/Ag$_2$Cr$_2$O$_7$ cells prepared according to Example 2 using Ag$_2$Cr$_2$O$_7$ prepared by this procedure is 3.4±0.05 V.

Example 6

The following preparative procedures are used to prepare the dichromates instead of the procedure of Example 5, the open circuit voltage of Li/AgCr$_2$O$_7$ cells assembled as in Example 2, are improved to 3.8±0.05 V from 3.4±0.05 V observed in Example 5.

6A. 2.47 g of AgO (solid) is mixed with 2.0 g CrO$_3$ in pestle and morter, and the mixture is set at 50° C. overnight. X-ray analysis of the resultant brownish red solid indicated the presence of Ag$_2$Cr$_2$O$_7$ and absence of AgO and CrO$_3$. Use of the Ag$_2$Cr$_2$O$_7$ sample as cathode in lithium cell provides open circuit voltage of 3.8±0.05 V.

6B. To a solution of 15 g $K_2S_2O_8$ in 150 ml water, a 100 ml solution of 16.9 g $AgNO_3$ is added, to precipitate AgO. To the in situ precipitated AgO solution a 100 ml solution of 19.4 g $K_2CrO_4$ is added and a precipitate is obtained. The precipitate is analyzed to be mainly $Ag_2Cr_2O_7$, which performed in cells substantially as the material of 6A.

6C. 12.4 g AgO was suspended in 250 ml water. To this suspension, 100 ml solution of 10.1 g $CrO_3$ is slowly added and stirred. The resultant precipitate is analyzed to be mainly $Ag_2Cr_2O_7$ and the dried material was substantially similar in performance to the material of 6A in cell performance.

COPPER CHROMATES

Preparation of $CuCrO_4$ and $CuCr_2O_7$ is generally a problem due to the high solubility of $CuCr_2O_7$ and/or its hydrolytic equilibrium.

For example, intermixing of equimolar quantities of CuO and $CrO_3$ in aqueous medium does not lead to the formation of a $CuCrO_4$ or $CuCr_2O_7$ precipitate as in the case of silver salts. Instead $2CuCrO_4.3Cu(OH)_2.H_2O$ and $CuCrO_4.Cu(OH)_2$ results. Even if the salts are formed by suitable preparative procedure, it is difficult to make a graphite-copper salt mix suitable for lithium cell cathodes, because of the tendency for the formation of the hydrated salt, as in $CuCrO_4.2H_2O$ ref.: S. H. C. Briggs, J. Chem. Soc. 1929, 242–245) and deliquescent nature of $CuCr_2O_7.2H_2O$ (Handbook of Chemistry and Physics, (see Physical Constants of Inorganic Compounds under $CuCr_2O_7.2H_2O$, $CuCrO_4.2CuO$ etc).

Included within the ambit of this invention is the discovery that suitable copper chromate or copper dichromate can be prepared for use in lithium cells by the following procedure which includes the graphite addition and in situ chromates crystallization process:

Example 7

A sample of 11.54 grams of $CuCO_3Cu(OH)_2$ (i.e. green-basic copper carbonate (assay: 55% Cu) is slowly added to 100 ml mixture of $H_2CrO_4$ solution containing 11.83 g $CrO_3$ and 2.1 g graphite powder. Upon addition of the green copper carbonate to the mixture, $CuCrO_4$ is formed in presence of the graphite. Also, $CO_2$ is evolved and $H_2O$ is formed in the reaction. The reacted mixture is slowly evaporated to crystallize the copper chromate in presence of the graphite. The mixture may be powdered and stored for direct use in lithium cells. Composition of $CuCrO_4$ is confirmed for the sample by X-ray diffraction.

Figure 5:
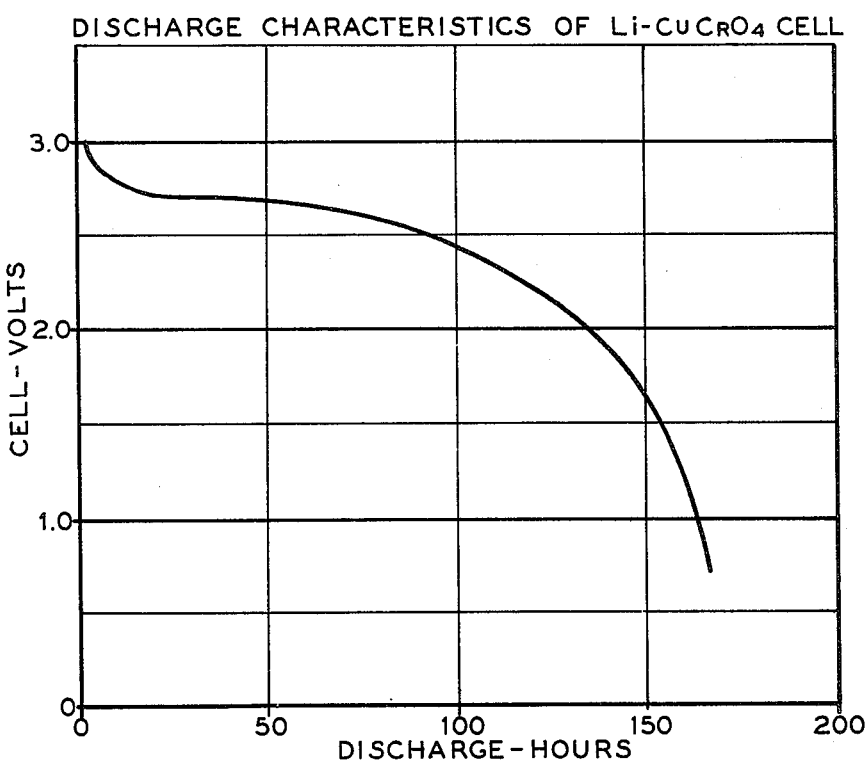

The open circuit voltage of the lithium-$CuCrO_4$ cell formed by using this cathode material formed by the above described procedure and prepared into cathodes and cells by the procedure of Example 2 is 3.9 V. The discharge curve of a Li/$CuCrO_4$ cell made into a button cell is as in FIG. 5.

Similar procedure was developed for the in situ formation of $CuCr_2O_7$-graphite mixture for use as lithium cell cathode. In this case, instead of 11.5 g $CrO_3$, 23 g of $CrO_3$ is used. Lithium-$CuCr_2O_7$ cells formed using this mixture showed an open circuit voltage of 3.85–3.9 V.

A similar procedure of in situ graphite with modified proportions may be adopted for the preparation of basic copper chromate salts.

MERCURY CHROMATES

In U.S. Pat. No. 3,658,592 patent, the use of mercuric chromate is taught. In this compound the ratio of Hg:Cr is 1:1. According to the present invention, compounds of various Hg:Cr ratios can be formulated by procedures as described below, and the compounds thus formed can be successfully employed as cell cathodes with lithium. The general preparative procedure consisted of the following:

Example 8

A known weight (5 to 40 grams) of $CrO_3$ was dissolved in 100 ml distilled water. To this solution 43.32 grams of HgO was added, and the mixes stirred for one day. The resultant mercury-chromate sample is filtered, washed with propylene carbonate or tetrahydrofuran, and dried in vacuum. The dried sample is weighed and also chemically analyzed to determine the yield and the $HgO:CrO_3$ ratio. The result of various preparations carried out is given in Table 1.

TABLE 2

| Preparation of $HgO.CrO_3$ Salts of Various Composition |||||
| 43.43 grams HgO is added in each case |||||
| Sample No. | Wt. of $CrO_3$ taken in 100 ml water (grams) | Starting Mole Ratio $HgO:CrO_3$ | Observed Yield % | Observed Mole Ratio $HgO:CrO_3$ |
| --- | --- | --- | --- | --- |
| 1 | 40 | 1:2 | 71.8 | 1:1.08 |
| 2 | 30 | 1:1.5 | 86.3 | 1:1.08 |
| 3 | 25 | 1:1.25 | 92.0 | 1:0.85 |
| 4 | 20 | 1:1 | 86.6 | 1:0.63 |
| 5 | 18 | 1:0.9 | 88.3 | 1:0.51 |
| 6 | 15 | 1:0.75 | 87.2 | 1:0.41 |
| 7 | 13 | 1:0.65 | 71.0 | 1:0.43 |
| 8 | 10 | 1:0.5 | 92.4 | 1:0.3 |
| 9 | 5 | 1:0.25 | 98.9 | 1:0.22 |
| 10 | 35 | 1:1.75 | 78.0 | 1:0.93 |
| 11 | 27 | 1:1.35 | 88.5 | 1:0.88 |
| 12 | 23 | 1:1.15 | 93.4 | 1:0.87 |

Table 2 shows that the $HgO:CrO_3$ ratio of the product can be varied to a wide extent (e.g. from 1:1 for sample 1 to 1:0.3 for sample 8) by varying the starting mole ratio of HgO and $CrO_3$.

Example 9

For the preparation of $Hg_2Cr_2O_7$, the following procedure was adopted.

¼ lb $HgCrO_4$ was added to a solution of 150 grams $CrO_3$ in 100 ml. The material was stirred overnight, then filtered and washed with acetone. 125 g of product is recovered.

Figure 6:
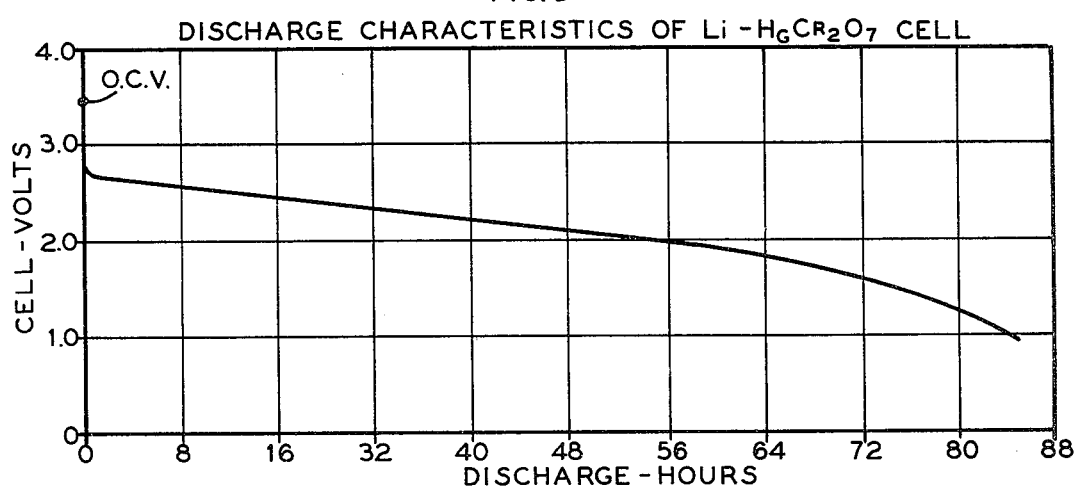

$HgO:CrO_3$ mixes of various ratios ranging from mercuric dichromate, mercuric chromates to basic mercuric chromates were employed as cathodes in lithium anode cells, and the discharge characteristics of such cells are shown in FIGS. 6–8.

FIG. 6: Discharge characteristics of Li—$HgCr_2O_7$ ($HgO:CrO_3$::1:2).

FIG. 7: Discharge characteristics of Li—$Hg_x(CrO_4)_y$ ($HgO:CrO_3$::1:0.93).

FIG. 8: Discharge characteristics of Li—$Hg_x(CrO_{4-})_y{}^-$, basic chromates, ($HgO:CrO_3$::1:0.3).

The results demonstrate that salts of various ratios of $HgO:CrO_3$ can be used as satisfactory depolarizers for the high energy density organic electrolyte cells.

What is claimed is:
1. A non-aqueous primary battery having

(a) a light metal anode selected from the group consisting of lithium, magnesium, aluminum, beryllium, calcium, sodium, and potassium;
(b) an electrolyte solution comprised of an organic solvent and a light inorganic salt dissolved therein;
(c) a separator; and
(d) a cathode consisting of silver chromate without binder or conductive additives.

2. The battery of claim 1 in which the light metal anode is lithium.

3. The battery of claim 1 in which the non-aqueous solvent is propylene carbonate.

4. The battery of claim 3 in which the light metal inorganic salt is lithium perchlorate and the concentration of the salt in the electrolytic solution is about 1 molar.

5. The battery of claim 3 wherein the light metal inorganic salt is lithium hexafluoroarsenate and the concentration of the salt in the electrolytic solution is about 1 molar.

6. The battery of claim 1 in which the light metal anode is lithium, and the electrolytic solution is propylene carbonate containing lithium perchlorate.

7. A method for preparing cathodes of metal chromates for use in high energy density, organic-electrolyte, electrochemical cells which consists essentially of the steps of compressing powdered metal chromate and uncured binder into cathode form at a pressure in the range 1500–5000 psi, and maintaining said cathodes at a temperature below about 25° C. throughout the formation of the cathodes, wherein said metal chromate is selected from the group consisting of metal chromates, metal dichromates and metal basic chromates.

8. The method according to claim 7 wherein said cathode in final form contains up to 5 percent of uncured fluorinated hydrocarbon binder.

9. The method according to claim 7 wherein said chromate is basic mercuric chromate having the formula $(HgO)_x(CrO_3)_y$ wherein the mole ratio of x/y varies from about 1:1 to 1:0.22.

* * * * *